United States Patent Office 3,470,181
Patented Sept. 30, 1969

3,470,181
FUSED 2-PYRIMIDINEPROPIONIC ACID COMPOUNDS, RELATED COMPOUNDS, AND THE PROCESS FOR THEIR PREPARATION
Peter H. L. Wei, Upper Darby, and Stanley C. Bell, Penn Valley, Pa., assignors to American Home Products Corporation, New York, N.Y., a corporation of Delaware
No Drawing. Filed Oct. 23, 1967, Ser. No. 677,049
Int. Cl. C07d 99/02, 99/04, 51/36
U.S. Cl. 260—251         6 Claims

ABSTRACT OF THE DISCLOSURE

The present invention is concerned with fused 2-pyrimidinepropionic acid compounds which are pharmacologically effective as analgesic and central nervous system depressants. Further, this invention is concerned with the process for the preparation of these compounds from their corresponding 3-cyanopropionamidotricyclic compounds.

---

The present invention relates to new and novel fused 2-pyrimidinepropionic acid compounds and to the novel process for their preparation. In particular, the present invention is concerned with fused 2-pyrimidinepropionic acids and their corresponding esters and salts which are pharmacodynamically efficacious as central nervous system depressants and analgesics.

The new and novel compounds which are within the purview of the present invention are represented by the following formula:

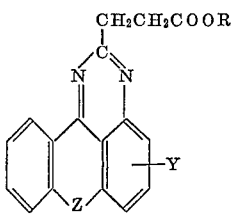

wherein Z is selected from the group consisting of a direct bond, sulfur, oxygen, imino, methylene, ethylene and ethylidene; Y is selected from the group consisting of hydrogen, halogen, lower alkyl and trifluoromethyl; and R is selected from the group consisting of hydrogen and lower alkyl; and the pharmaceutically acceptable salts thereof. The term lower alkyl as employed herein is defined as the straight and branched chained moieties having from about one to about seven carbon atoms. When the new compounds of the present invention are represented by the above structural formula wherein Z is a "direct bond," the compounds are called "indeno[1,2,3 - d,e]quinazoline - 2 - propionic acid compounds"; when Z is "sulfur" the compounds are named as "[1]benzothiopyrano[4,3,2 - d,e] quinazoline-2-propionic acid compounds"; when Z is "oxygen" the compounds are designated as "[1]benzopyrano [4,3,2-d,e]quinazoline-2-propionic acid compounds"; when Z is "imino" the compounds are demonstrated as "7H-pyrimido[4,5,6 - m,n]acridine - 2 - propionic acid compounds"; when Z is "methylene" the compounds are named as "7H-benzo[e]perimidine-2-propionic acid compounds"; when Z is "ethylene" the compounds are called "7,8-dihydrobenzo[6,7]cyclohepta[1,2,3-d,e]quinazoline - 2 - propionic acid compounds"; and when Z is "ethylidene" the compounds are designated "benzo[6,7]cyclohepta [1,2,3-d,e]quinazoline-2-pripionic acid compounds."

The fused 2-pyrimidinepropionic acid compounds of the present invention may be prepared by the new and novel process which is schematically depicted as follows:

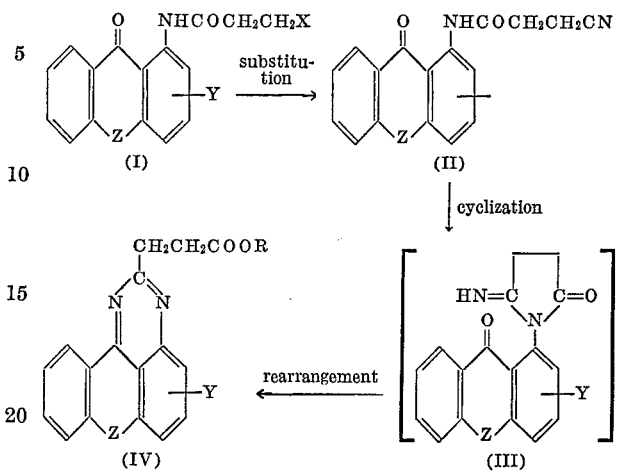

wherein Z, Y and R are defined as above and X is a halogen atom. The substitution reaction is effected by admixing a 3-halopropinonamido tricycle compound (I) with not more than two molar equivalents of an alkali metal cyanide, e.g., lithium cyanide, potassium cyanide and sodium cyanide in a reaction-inert solvent at a temperature range from about 60° C. to about reflux temperature for a period of about one to about five hours. Preferably, this reaction is conducted in ethanol at reflux temperatures for about four hours.

By reaction-inert solvent as employed above is meant any solvent which will dissolve the reactants, e.g. water, alkanols and water-alkanol mixtures. Other suitable solvents will readily suggest themselves to those skilled in the art of chemistry.

When the substitution reaction is complete, the resulting 3-cyanopropionamido tricyclic compound (II) is obtained by standard recovery procedures, e.g., as hereinafter described.

The cyclization and rearrangement reaction is effected by suspending the above prepared 3-cyanopropionamido tricycle compound (II) in an aqueous or alkanolic solution of a strong base, for example, an alkali metal cyanide or hydroxide, such as sodium cyanide, potassium cyanide, lithium cyanide, sodium hydroxide and potassium hydroxide and heating the resulting mixture from about 60° C. to about reflux temperature for a period of about one half hour to about five hours. Preferably this reaction is conducted at steam bath temperatures for about two hours.

When the cyclization and rearrangement reaction is complete, the appropriate fused 2-pyrimidinepropionic acid compound (IV) may be separated by conventional recovery procedures, e.g. as hereinafter described. It should be noted, that when the above reaction is conducted in water, the product (IV) will be the free carboxylic acid. Alternatively, if the reaction is carried out in an alkanol solvent, the product (IV) will be the corresponding carboxylic acid ester, for example, when methanol is employed as the solvent the product will be the corresponding methyl ester. Compound III as shown in the above reaction scheme is a postulated intermediate which has not been isolated but is herein included to help elucidate the reaction mechanism of the above-described process.

When the fused 2-pyrimidinepropionic acid compound (IV) is in the form of free carboxylic acid, it may be recovered from the reaction mixture of both of the above described processes by filtering the reaction mixture, extracting the filtrate with a water immiscible solvent, e.g.

chloroform, neutralizing the aqueous solution with an acid, and collecting the resulting solid which may then be recrystallized from a suitable solvent, for example, ether, benzene, dimethoxyethane-benzene or an alkanol. Alternatively, if the 2-pyrimidinepropionic acid compound (IV) is in the ester form, it may be recovered by filtering the reaction mixture, concentrating the filtrate, extracting the residue, e.g., with cyclohexane, reconcentrating, dissolving the residue in a water immiscible solvent, extracting with water, drying, reconcentrating and recrystallizing the residue from an appropriate solvent, e.g. cyclohexane.

The pharmaceutically acceptable salts of the compounds of the present invention may be prepared by procedures well known to those skilled in the art, for example, neutralization of a fused 2-pyrimidinepropionic acid with a base, e.g. an alkali metal hydroxide, or the alkaline hydrolysis of the corresponding ester. In this regard, it should be noted that a fused 2-pyrimidinepropionic acid salt may be converted to the free carboxylic acid by acidification of said salt. The time and temperature ranges employed as above are not critical and simply represent the most convenient ranges consistent with carrying out the reaction in a minimum of time without undue difficulty. Thus, reaction temperatures appreciable below these can be used, but their use considerably extends the reaction time. Similarly, reaction temperatures higher than those mentioned can be employed with a concomitant decrease in reaction time. The amount of solvent used in the aforesaid reactions is not critical, it being only necessary to use a sufficient amount of solvent to provide a reaction medium for the particular reactants.

Many of the reactants employed in the processes of this invention are known compounds which are readily available from commercial sources, while the remainder can easily be prepared in accordance with standard organic procedures well known to those skilled in the art, e.g., the procedure as described in Example I.

In accord with the present invention, the new and novel indeno[1,2,3-d,e]quinazoline-2-propionic acid compounds of the present invention have been found to possess interesting pharmaceutical properties which render them useful as synthetic medicinals. More particularly, these compounds, in standard pharmacological tests, have exhibited utility as analgesics, and central nervous system depressants.

When the indeno[1,2,3-d,e]quinazoline - 2 - propionic acids of this invention are employed as analgesics and central nervous system depressants, they may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules containing such excepients as starch, milk sugar, certain types of clay and so forth. They may also be administered orally in the form of solutions which may contain coloring and flavoring agents or they may be injected parenterally, that is intramuscularly, intravenously or subcutaneously. For parenteral administration, they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about 100 mg. to about 400 mg. per day, although as aforementioned variations will occur. However, a dosage level that is in the range of from about 200 mg. to about 300 mg. per day is most desirably employed in order to achieve effective results.

The following examples are given by way of illustration.

EXAMPLE I

To 1-amino-9-fluorenone (20.0 g.; .1025 m.) in 500 ml. of chloroform, there is slowly added 20 g. (.158 m.) of 3-chloropropionyl chloride. The mixture is heated to reflux for ten hours and is then treated with charcoal. After the solvent is removed in vacuo, the residual solid is treated with benzene to afford 3-chloro-N-(9-oxo-1-fluorenyl)propionamide (28 g.) which, after recrystallization from benzene, has a M.P. of 146–148° C.

*Analysis.*—Calc'd for $C_{16}H_{12}ClNO_2$: C, 67.25; H, 4.23; Cl, 12.41; N, 4.90. Found: C, 67.25; H, 4.61; Cl, 12.1; N, 4.94.

EXAMPLE II

A solution of 6.8 g. (0.0239 m.) of 3-chloro-N-(9-oxo-1-fluorenyl)propionamide and 3.1 g. (0.0478 m.) of potassium cyanide in 250 ml. of absolute ethanol is heated to reflux for two and a half hours. The solid is collected and the filtrate concentrated to give more solid. The crude material is first washed with water and then recrystallized from ethanol to give 3.9 g. of 3-cyano-N-(9-oxo-1-fluorenyl)propionamide, M.P. 159–161° C.

*Analysis.*—Calc'd for $C_{19}H_{16}N_2O_2$: C, 73.89; H, 4.38; N, 10.14. Found: C, 73.82; H, 3.97; N, 9.95.

In the same manner, 3-bromo-N-(9-oxo-1-fluorenyl) propionamide is reacted with sodium cyanide to also afford 3-cyano-N-(9-oxo-1-fluorenyl)propionamide.

EXAMPLE III 3-cyano-N-(9-oxo-1-fluorenyl)propionamide (2.5 g.) is suspended in a dilute sodium hydroxide solution and is heated on a steam bath for two hours. The solution is cooled, filtered from insoluble material, extracted with chloroform and the aqueous solution is neutralized with acetic acid. An oily material separates which upon standing solidifies and is collected, washed with water and recrystallized from a mixture of dimethoxyethane and benzene to give 1.5 g. of indeno[1,2,3-d,e]quinazoline-2-propionic acid, M.P. 207–209° C.

*Analysis.*—Calc'd for $C_{17}H_{12}N_2O_2$: C, 73.89; H, 4.38; N, 10.14. Found: C, 73.63; H, 4.33; N, 9.89.

Similarly, the above reaction is repeated using lithium cyanide instead of sodium cyanide to produce the same product.

EXAMPLE IV

When the procedure of Example III is repeated to react an appropriate 3-halopropionamido tricyclic compound with an alkali metal cyanide in an aqueous media, the following fused 2-pyrimidinepropionic acids are obtained:

[1]benzopyrano[4,3,2-d,e]quinazoline-2-propionic acid;
5-chloro-[1]benzothiopyrano[4,3,2-d,e]quinazoline-2-propionic acid;
4-ethyl-7H-benzo[e]-perimidine-2-propionic acid;
Benzo[6,7]cyclohepta[1,2,3-d,e]quinazoline-2-propionic acid;
7,8-dihydro[6,7]cyclohepta[1,2,3-d,e]quinazoline-2-propionic acid;
4-bromo-7H-pyrimido[4,5,6-m,n]acridine-2-propionic acid;
4-trifluoromethyl-[1]-benzopyrano[4,3,2-d,e]quinazoline-2-propionic acid;
[1]benzothiopyrano[4,3,2-d,e]quinazoline-2-propionic acid;
7H-benzo[e]pyrimidine-2-propionic acid;

5-chlorobenzo[6,7]cyclohepta[1,2,3-d,e]quinazoline-2-propionic acid;
4-fluoro-7,8-dihydro[6,7]cyclohepta[1,2,3-d,e]quinazoline-2-propionic acid; and
7H-pyrimido[4,5,6-m,n]acridine-2-propionic acid.

EXAMPLE V 3-cyano-N-(9-oxo-1-fluorenyl)propionamide (5.0 g.) is suspended in 200 ml. absolute ethanol and heated to reflux in the presence of 2.0 g. potassium cyanide for one hour. The solid is filtered off, the filtrate concentrated, the residue extracted with hot cyclohexane, and concentrated to dryness. The resulting residue is dissolved in ether, the ether extract washed with water, dried over anhydrous magnesium sulfate and after removal of ether, the residue is recrystallized from cyclohexane to afford indeno[1,2,3-d,e]quinazoline-2-propionic acid, ethyl ester, M.P. 98–100° C.

*Analysis.*—Calc'd for $C_{19}H_{16}N_2O_2$: C, 74.99; H, 5.30; N, 9.21. Found: C, 75.00; H, 5.46; N, 9.14.

EXAMPLE VI

Repeating the procedure as described in Example V, the following fused 2-pyrimidine propionic acid esters are prepared:

5-fluoro[1]benzopyrano[4,3,2-d,e]quinazoline-2-propionic acid, ethyl ester;
4-chloroindeno[1,2,3-d,e]quinazoline-2-propionic acid, methyl ester;
[1]benzothiopyrano[4,3,2-d,e]quinazoline-2-propionic acid, hexyl ester;
5-methylindeno[1,2,3-d,e]quinazoline-2-propionic acid, propyl ester;
4-propyl-7H-benzo[e]pyrimidine-2-propionic acid, methyl ester;
Benzo[6,7]cyclohepta[1,2,3-d,e]quinazoline-2-propionic acid, ethyl ester;
5-iodo-7,8-dihydrobenzo[6,7]cyclohepta[1,2,3-d,e]quinazoline-2-propionic acid, methyl ester;
4-methyl-7H-pyrimido[4,5,6-m,n]acridine-2-propionic acid, ethyl ester.

EXAMPLE VII

An ethanolic solution of indeno[1,2,3-d,e]quinazoline-2-propionic acid, ethyl ester (50 ml.) is admixed and stirred for one hour with 1 N sodium hydroxide (20 ml.) and the solvent removed by evaporation. The residue contains the sodium salt of indeno[1,2,3-d,e]quinazoline-2-propionic acid.

In the same manner, the alkali metal and alkaline earth metal salts of the above described examples may easily be prepared by this procedure.

What is claimed is:

1. A compound selected from the group consisting of those having the formula:

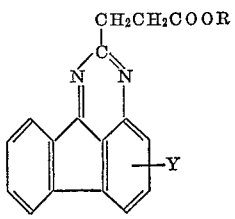

wherein Y is selected from the group consisting of hydrogen, halogen, lower alkyl and trifluoromethyl; R is selected from the group consisting of hydrogen and lower alkyl; and the pharmaceutically acceptable salts thereof.

2. A compound as described in claim 1 which is: indeno[1,2,3-d,e]quinazoline-2-propionic acid.
3. A compound as described in claim 1 which is: indeno[1,2,3-d,e]quinazoline-2-propionic acid, ethyl ester.
4. A compound as described in claim 1 which is: indeno[1,2,3-d,e]quinazoline-2-propionic acid, methyl ester.
5. A process for the preparation of compounds having the formula:

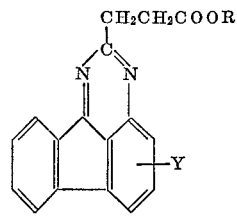

wherein Y is selected from the group consisting of hydrogen, halogen, lower alkyl and trifluoromethyl; R is selected from the group consisting of hydrogen and lower alkyl which comprises contacting of cyano compound of the formula:

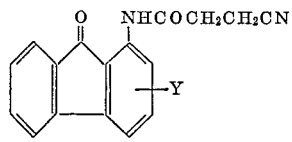

wherein Y is defined as above, with a strong base selected from the group consisting of an alkali metal cyanide and an alkali metal hydroxide in a solvent selected from the group consisting of water and a lower alkanol at a temperature range from about 60° C. to about reflux temperature for a period from about one-half hour to about five hours.

6. A process as described in claim 1 wherein the strong base is selected from the group consisting of sodium cyanide, potassium cyanide, lithium cyanide, sodium hydroxide and potassium hydroxide.

References Cited

UNITED STATES PATENTS 3,127,401   3/1964   Lawes et al. _____ 260—251

NICHOLAS S. RIZZO, Primary Examiner

R. V. RUSH, Assistant Examiner

U.S. Cl. X.R.

260—256.4, 279, 326.5, 327, 345.3, 351, 465; 424—251